(12) United States Patent
Weidner et al.

(10) Patent No.: US 8,632,257 B2
(45) Date of Patent: Jan. 21, 2014

(54) ROLLING BEARING AND METHOD FOR THE PRODUCTION THEREOF

(71) Applicant: Schaeffler Technologies AG & Co. KG, Herzogenaurach (DE)

(72) Inventors: Alexander Weidner, Fuerth (DE); Markus Hennefelder, Ipsheim (DE); Paul Graf, Uehlfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/892,645

(22) Filed: May 13, 2013

(65) Prior Publication Data

US 2013/0251297 A1 Sep. 26, 2013

Related U.S. Application Data

(62) Division of application No. 12/158,391, filed as application No. PCT/DE2006/002193 on Dec. 9, 2006, now Pat. No. 8,459,876.

(30) Foreign Application Priority Data

Dec. 21, 2005 (DE) .......................... 10 2005 061 179

(51) Int. Cl.
*F16C 33/64* (2006.01)
*F16C 33/58* (2006.01)
*F16C 33/36* (2006.01)

(52) U.S. Cl.
USPC .......................................... 384/564; 384/568

(58) Field of Classification Search
USPC ................................... 384/564, 565, 568, 569
See application file for complete search history.

(56) References Cited

U.S. PATENT DOCUMENTS

| | | | | |
|---|---|---|---|---|
| 1,736,037 A | * | 11/1929 | Else | 384/565 |
| 2,659,637 A | | 11/1953 | Barr | |
| 5,503,481 A | | 4/1996 | Hashimoto et al. | |
| 6,086,261 A | * | 7/2000 | Nakagawa et al. | 384/571 |
| 6,126,322 A | * | 10/2000 | Otsuki et al. | 384/544 |
| 6,254,277 B1 | * | 7/2001 | Nagai et al. | 384/450 |
| 6,379,049 B1 | | 4/2002 | Shibazaki et al. | |
| 2005/0102837 A1 | | 5/2005 | Kaminski | |
| 2006/0242837 A1 | | 11/2006 | Nagano | |
| 2006/0291759 A1 | * | 12/2006 | Koyama et al. | 384/450 |
| 2008/0260313 A1 | * | 10/2008 | Murai et al. | 384/473 |

FOREIGN PATENT DOCUMENTS

| | | |
|---|---|---|
| CN | 1607056 A | 4/2005 |
| DE | 19900858 A1 | 8/1999 |
| DE | 19840738 A1 | 3/2000 |
| DE | 10042901 A1 | 6/2001 |

(Continued)

OTHER PUBLICATIONS

Matsumoto, et al. "Surface Integrity Generated by Precision Hard Turning" Annals of the CIRP, vol. 48, No. 1, 1999.

*Primary Examiner* — William C Joyce
*Assistant Examiner* — Terence Boes
(74) *Attorney, Agent, or Firm* — Lucas & Mercanti, LLP

(57) ABSTRACT

A bearing ring comprises a raceway for a rolling member as well as at least one lateral rim for axially guiding the rolling member. To produce the bearing ring a notch is introduced into a running surface of the bearing ring which faces the rolling member. A final contour of the bearing ring is created by means of a hard turning process.

8 Claims, 5 Drawing Sheets

(56) References Cited

FOREIGN PATENT DOCUMENTS

| | | |
|---|---|---|
| EP | 1347185 A2 | 9/2003 |
| FR | 768354 A | 8/1934 |
| FR | 2776237 A1 | 9/1999 |
| JP | 61082017 A | 4/1986 |
| JP | 5178520 A | 7/1993 |
| JP | 6246547 A | 9/1994 |
| JP | 2000002251 A | 1/2000 |
| JP | 2002257142 A | 9/2002 |
| JP | 2003278745 A | 10/2003 |
| JP | 2003322156 A | 11/2003 |
| JP | 2004144279 A | 5/2004 |
| JP | 2005118986 A | 5/2005 |
| WO | 0125645 A2 | 4/2001 |

* cited by examiner

ROLLING BEARING AND METHOD FOR THE PRODUCTION THEREOF

CROSS-REFERENCE TO RELATED APPLICATIONS

The present application is a Divisional Application of U.S. patent application Ser. No. 12/158,391, filed Jun. 20, 2008, which is a 371 of International application PCT/DE2006/002193, filed Dec. 9, 2006, which claims priority of DE 10 2005 061 179.6, filed Dec. 21, 2005, the priority of these applications is hereby claimed and these applications are incorporated herein by reference.

FIELD OF THE INVENTION

The present invention relates to a roller bearing and a method for the production thereof. In particular, the invention relates to a method for producing a bearing ring of the roller bearing and an associated roller body.

BACKGROUND OF THE INVENTION

Various roller bearings are known from the prior art. For example, roller bearings are known in which a bearing ring, i.e. the outer ring and/or the inner ring, has a rim in order to absorb axial forces acting on the bearing. In methods for producing roller bearings which are known from the prior art, the respective bearing rings are produced by means of a turning method and subsequently what is referred to as a grinding undercut is provided in a still unhardened state in a corner region between the raceway of the bearing ring and the lateral rim. This grinding undercut is required to be able to subsequently grind the raceway and the rim running face.

This grinding undercut results in a sharp edge in the rim running face. This edge, in turn, in combination with unsuitable lubricants, can damage roller end faces due to the axial running on of the roller end faces. To be more precise, due to the edge it is possible for minor damage to occur to the roller bodies and their end faces. In particular when roller bodies are used with planar roller end faces, such damage to these faces by the edge is likely to occur.

SUMMARY OF THE INVENTION

The present invention is based on the object of making available a method for producing a roller bearing with which a roller bearing can be made available with a prolonged service life compared to the prior art. In addition, the intention is to increase the axial load-bearing capacity of bearings.

The present invention is also aimed at a roller bearing which achieves improved contact between the end faces of the roller bodies on the one hand and the inner wall of the rim on the other.

The aforesaid objects are achieved by means of the subject matters of the independent claims. Advantageous embodiments and developments are the subject matter of the subclaims. However, it is to be noted that the subject matters of all the subclaims do not solve all the inventive problems to the same degree.

Furthermore, it is to be noted that the subject matters of all the independent claims are based on the same problem, namely of increasing the service life of the roller bearings.

In the inventive method for producing a bearing ring for a roller bearing, wherein the bearing ring has a raceway for a roller body and at least one lateral rim for axially guiding the roller body, in one method step a notch is made in a wall of the bearing ring facing the roller body. According to the invention, the end contour of the bearing ring is produced by a hard turning process.

The rim is preferably also used for absorbing loads acting axially on the roller bearing.

An end contour of the bearing ring is understood to be a contour which only still requires fine processing for completion, the formation of the notch also being considered to be fine processing.

The bearing ring which is already hardened is processed by means of the hard turning process according to the invention. In this case, there is no need to grind the rim running face further.

A notch is understood to be a groove or recess which is preferably formed essentially in the radial direction in the bearing ring. This notch, which performs the function of a grinding undercut, is preferably located in a corner region between the rim running face and the raceway.

The present invention is also aimed at a method for producing a bearing ring for a roller bearing, wherein the bearing ring has a raceway for a roller body and at least one lateral rim for axially guiding the roller body. In this context, in one method step, a notch is made in a wall of the bearing ring facing the roller body. According to the invention, in this method the notch is produced by forming a groove with a groove body in essentially the radial direction of the roller bearing.

The groove body can be used to form a groove in the radial direction of the roller bearing if the lateral rim or its inner wall no longer needs to be subsequently ground. Forming a groove with the groove body in the radial direction of the roller bearing prevents an edge being produced in the rim running face and damaging the individual roller bodies during later operation.

In a further method step the raceway is preferably ground. The notch in the corner region between the raceway and the lateral rim is used to carry out this grinding. The notch prevents damage to the rim face by the grinding tool. In a further preferred embodiment, the rim is hard turned with a rim angle of aperture of more than 90°. After this hard turning, in a last work step the notch or the grinding undercut is formed in order to permit the raceway to be ground.

The rim angle of aperture is preferably between 90° and 92°. The contact geometry between the roller body and the rim running face is improved by this rim angle of aperture.

To be more precise, the run up between the roller bodies and the rim is improved by this rim angle of aperture which is slightly above 90°, for example 90.5°, therefore increasing the service life of the roller bearing.

The present invention is, as stated above, also aimed at a method for producing a roller body for a roller bearing, wherein the roller body has at least one end face which is curved in sections. As stated above, planar end faces, which are subject to high stresses when in contact with the rim, are used in the prior art. Provision of a curved end face ensures that instead of a contact face, known from the prior art, between the roller and the rim, only essentially a point of contact occurs between the roller body and the rim. The lubrication between the roller body and the rim can also be improved.

In this way, the service life and the axial load-bearing capacity of the bearing according to the invention can also be increased. The end face of the roller body is understood to be that face which is turned towards the rim. According to the invention, the roller body is also produced by means of a hard turning process. Using a hard turning process facilitates the production of a curved end face according to the invention.

The end face is preferably curved at least in sections, in particular is curved logarithmically or in a toroidal shape.

A toroidal body is understood to be a body which is produced as a result of the turning of a circle about an axis lying in the circular plane outside the circle. With respect to the roller body, a toroidal end face is understood to mean that the end face produces a line in a projection in a radial direction of the roller body, and this line is curved in particular in a circular or ellipsoidal shape in its end regions. In this context, the geometric centre point of this circular or ellipsoidal curvature does not lie on the geometric axis of symmetry of the roller body but rather is spaced apart from it.

This curved, in particular toroidal, surface has proven particularly suitable in complex trials for reducing damage produced by the running up of the end face against the rim running face.

The present invention is also aimed at a roller bearing with a raceway for roller bodies which has at least one lateral rim for axially guiding the roller bodies, wherein the rim has a rim running face which is turned toward the roller body, and a notch is provided in a corner region between the raceway and the rim running face. According to the invention, the notch and the wall of the rim merge one into the other essentially without an edge.

In other words, a tangent to an end point or end region of the notch extends essentially parallel to the rim running face. In contrast, this parallelism does not occur in the prior art, in other words there is an edge. This edgeless transition means that the roller body and its end face cannot be damaged by the edge when they run up.

In a further preferred embodiment, the notch has at least in sections a circular-segment-shaped profile, wherein this circular-segment-shaped profile has a radius of curvature which is between 0.5 mm and 2 mm, and preferably between 1 mm and 1.5 mm. This notch serves, as stated above, as a grinding undercut which permits the raceway to be ground. Since the profile between the notch and the wall is edgeless, it is not possible to grind the rim running face.

The notch preferably has an end region facing the raceway of the bearing ring, and in this end region said notch extends at an angle with respect to the raceway which is between 20° and 40°, preferably between 25° and 37°, and particularly preferably between 30° and 34°.

The present invention is also aimed at a roller body, wherein according to the invention the roller body has at least one and preferably two end faces which are curved at least in sections, in particular are curved logarithmically or in a toroidal shape.

This end face which is curved in particular in a toroidal shape ensures that the contact between the rim and the roller body is not punctiform or linear but rather over a surface. This contact over a surface permits improved lubrication of the roller bearing.

The roller body preferably has, in at least one end region, a lateral face which is curved in the axial direction of the roller body. In this way it is also possible to improve the running up of the roller body with respect to the raceway. The lateral face is preferably curved convexly.

The present invention is also aimed at a roller bearing having a bearing ring of the type described above, and at a roller bearing having at least one roller body of the type described above.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
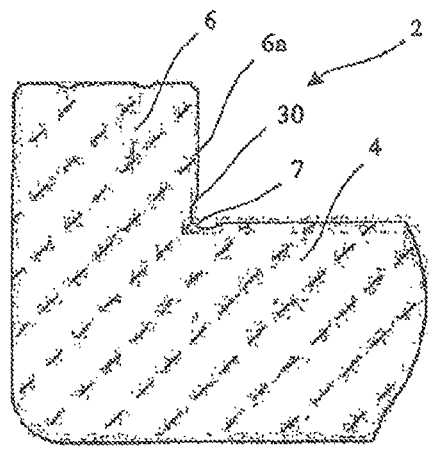
FIG. 1 shows a partial illustration of a bearing ring according to the prior art.

FIG. 1 shows a detail illustration of a bearing ring 2 manufactured using a method known from the prior art. The reference symbol 4 here refers to a central region of the bearing ring and the reference symbol 6 refers to a lateral rim. The rim running face 6a of the rim is facing a roller body (not shown).

As mentioned at the beginning, in the method known from the prior art the notch 7 or the grinding undercut is formed in the material before the hardening process. The material is hardened only after this. In this method it is also still necessary to grind the rim running face 6a. Therefore, the notch 7, as shown in FIG. 1, is formed in an oblique direction with respect to the rim 6 and the central region 4. As a result, an edge 30 is produced in the rim running face 6a in the prior art. This sharp edge 30 can have unfavorable effects on the start of axial movement, in particular of planar roller end faces.

Figure 2:
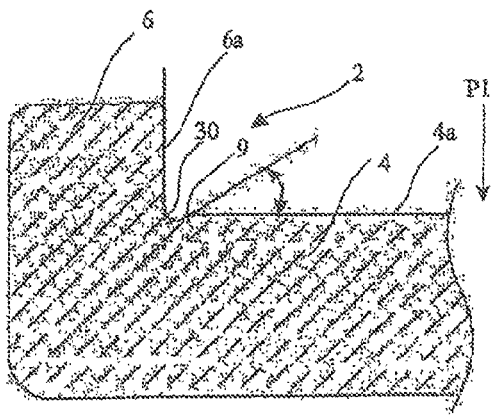
FIG. 2 shows a partial illustration of a bearing ring according to the invention.

FIG. 2 shows a bearing ring manufactured according to the inventive method. In this context, the material of the bearing ring is firstly hardened and the end contour, in particular the end contour of the rim running face 6a, is then produced by hard turning. In this case, subsequent grinding of the rim running face 6a is not necessary, but only the raceway 4a of the central region 4 needs to be ground. In this case, the tool for producing the grinding undercut is introduced into the notch 7 in the radial direction P1 of the bearing ring 2, avoiding an edge 30 being formed as in FIG. 1.

To be more precise, the hard turning of the rim face 6a is finished by complying with a necessary mean value for the rim aperture in the region between 90° and 92°, for example 90.5°, and in a final work step the grinding undercut is formed in order to permit the raceway 4a to be ground.

The reference symbol 9 refers to an end region of the notch 7 facing the raceway 4a. This end region runs in an axial direction at an angle of approximately 32° with respect to the raceway.

Figure 3:
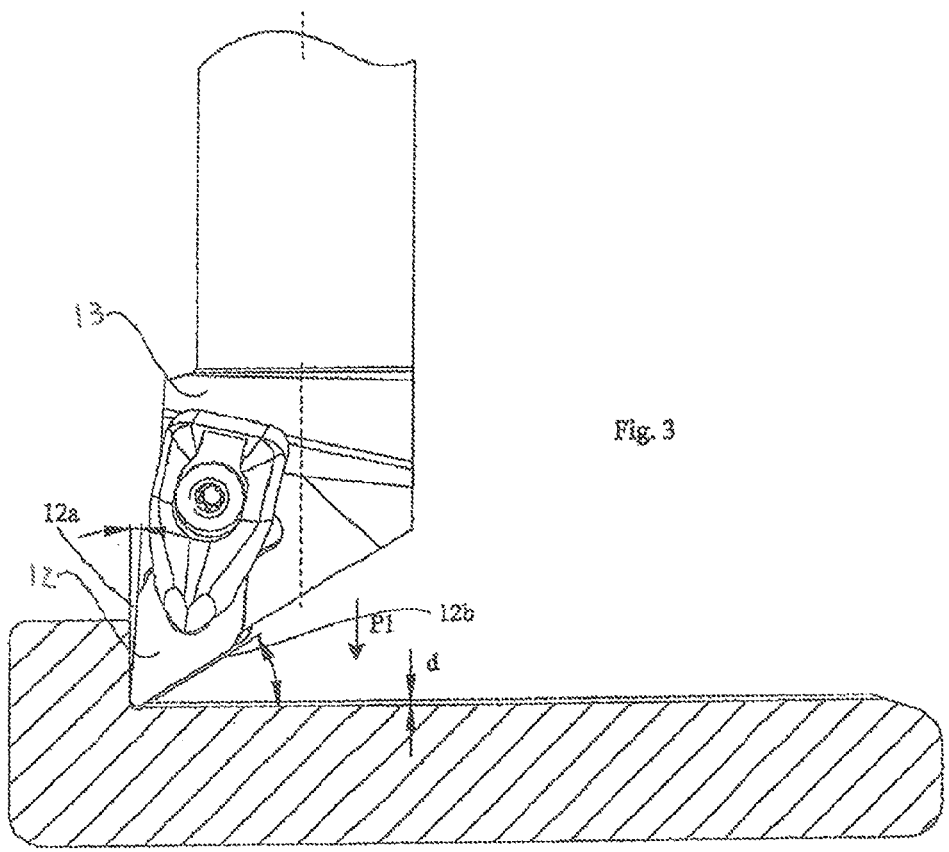
FIG. 3 shows an illustration of the production method for a bearing ring according to the invention.

FIG. 3 illustrates the production of the notch 7 or of the grinding undercut in a method according to the invention. For this purpose, a tool 13 is pushed into the bearing ring 2 in an essentially radial direction (arrow P1) after the hard turning of the bearing ring. The reference symbol 12 characterizes a groove body of the tool 13. The reference symbol d denotes the grinding dimension, which is in the vicinity of 0.5 mm. The angle β between the edge 12b of the groove body 12 and the raceway 4a is in a range between 30° and 35°.

The rim running face 6a does not extend at an angle of precisely 90° with respect to the raceway 4a but rather at a slightly larger angle. The angle γ between the edge 12a of the groove body 12 and the rim running face 6a is between 3° and 4°.

Figure 4:
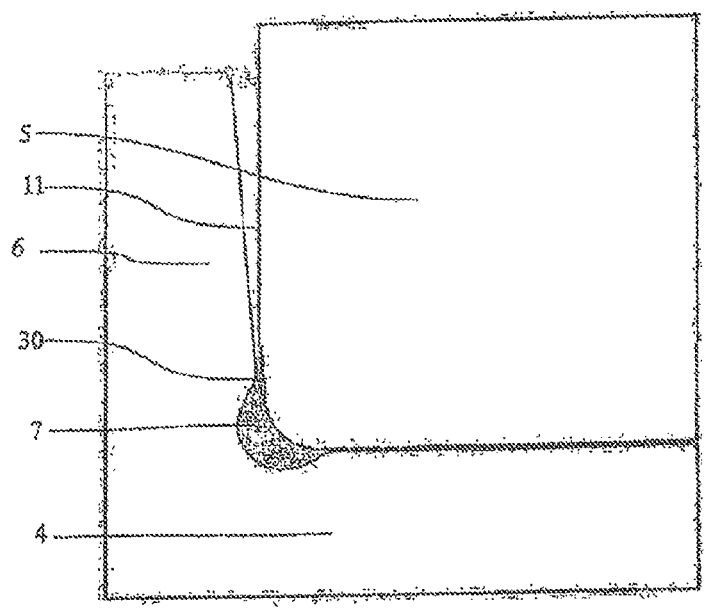
FIG. 4 shows a partial illustration of a bearing ring according to the prior art with a roller body.

FIG. 4 is an illustration of a detail of a bearing ring according to the prior art with a roller body 5 which runs up against it. In this context, the rim angle is not illustrated to scale here. It is apparent that the roller body 5 can make contact with the edge 30 of the grinding undercut at the notch 7. Since the roller body moves with respect to this sharp edge 30, the small damage which was mentioned at the beginning can occur to the roller body and therefore accelerated wear thereof may occur. The reference symbol 11 refers to the end face of the roller body.

Figure 5:
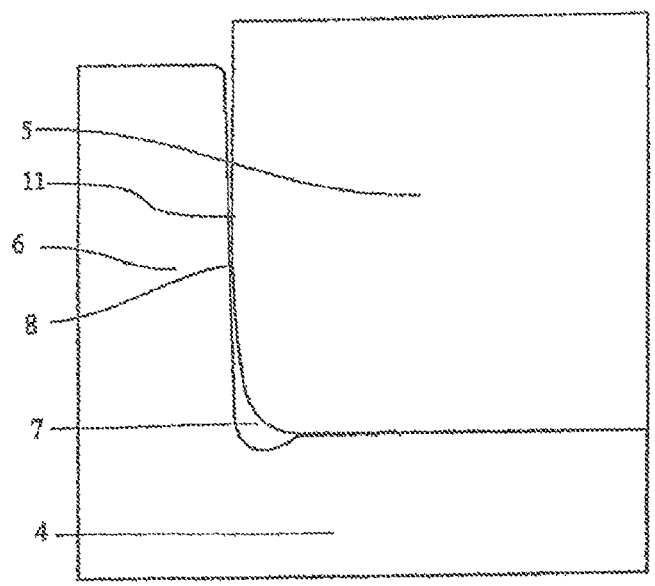
FIG. 5 shows an enlarged partial illustration of a bearing ring according to the invention with a roller body.

FIG. 5 shows a bearing ring with a roller body in which the bearing ring has been manufactured with the methods according to the invention. It is apparent that in this case there is no edge 30 and therefore the roller body 5 is treated in a correspondingly gentler way.

Figure 6:
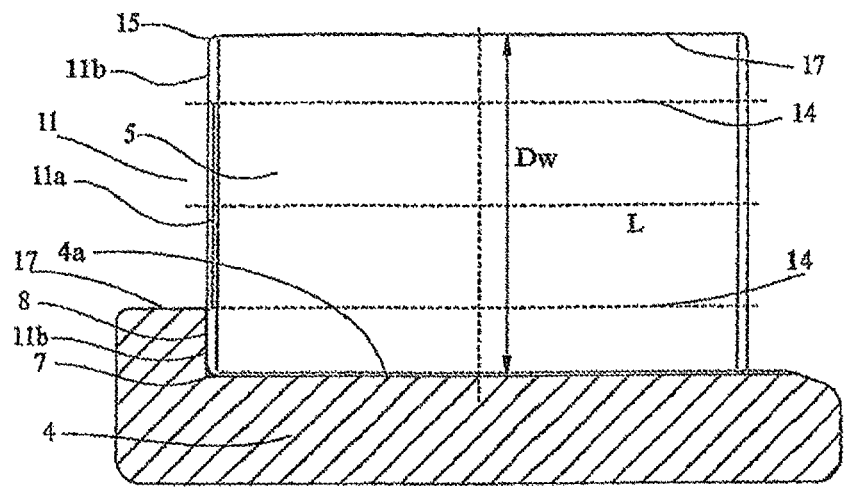
FIG. 6 shows an illustration of a bearing ring with a roller body.

FIG. 6 shows an illustration of a bearing ring 2 with a roller body 5. This concerns a hard-turned bearing ring also. The end face 11 of the roller body 5 has a central region 11a which can be implemented in essentially any desired way since it does not run up against the rim 6. It is also conceivable for the central region 11a of the end face 11 to have a trough or the like. As a result of the special configuration of the edge regions 11b of the end face 11 it is possible to ensure that only a single contact point occurs between the rim and the end face, which is explained in more detail below.

The contact point between the end face 11 of the roller body and the rim face 6a is denoted by 8. The radius of curvature of the corner region 15 of the roller body is between 0.5 mm and 4 mm, preferably between 1 mm and 2 mm, and particularly preferably in the vicinity of 1.5 mm.

The reference sign L refers to the rotational axis or axis of symmetry of the roller body 5. The reference symbol 14 denotes a toroidal center point line on which, given a toroidal curvature of the roller body, the groove point 16 or center point for the toroidal curvature lies. The line 14, and therefore the groove point for the toroidal curvature, is preferably located at the level of the end face 17 of the rim 6.

Figure 7:
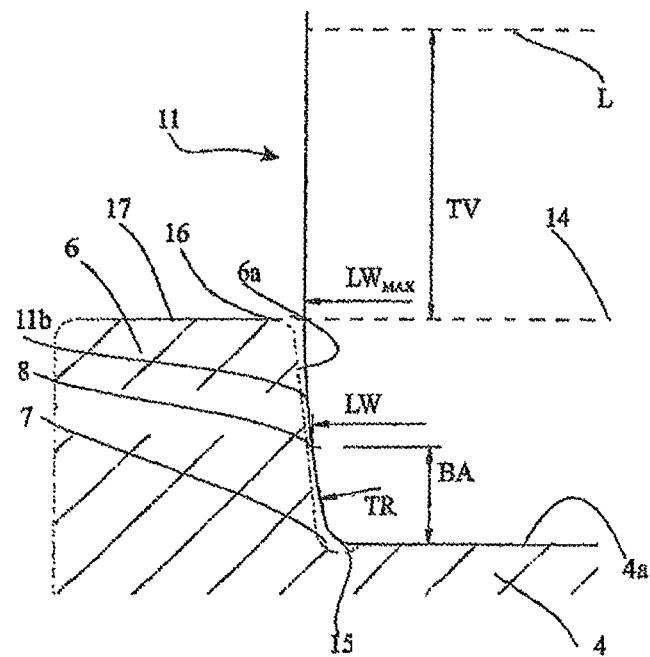
FIG. 7 shows an enlarged illustration of a bearing ring with a roller body according to the invention.

FIG. 7 shows an enlarged illustration of the arrangement shown in FIG. 6. Here, the reference symbol TV denotes the distance by which the toroidal center point line 14 is displaced with respect to the axis L of symmetry. This means that in the embodiment shown in FIG. 7 the curvature in the edge region 11b of the end face 11 of the roller body lies on a circle whose circle center point (which is equal to the groove point 16) lies in turn on the line 14. Here, the edge region 11b is a single curved region continuously curving in an axial direction away from the central region 11a.

The reference symbol $LW_{max}$ refers to the maximum length of the roller body, and the reference symbol LW refers to the length of the roller body in the vicinity of the contact point 8 between the roller body and the rim running face 6a. This contact point 8 is at the distance BA from the raceway 4a of the bearing ring 2. In the embodiment shown here, the contact point 8 is approximately at the same distance, in the radial direction, from the end face 17 of the rim 6 and from the raceway 4a of the bearing ring.

Figure 9:
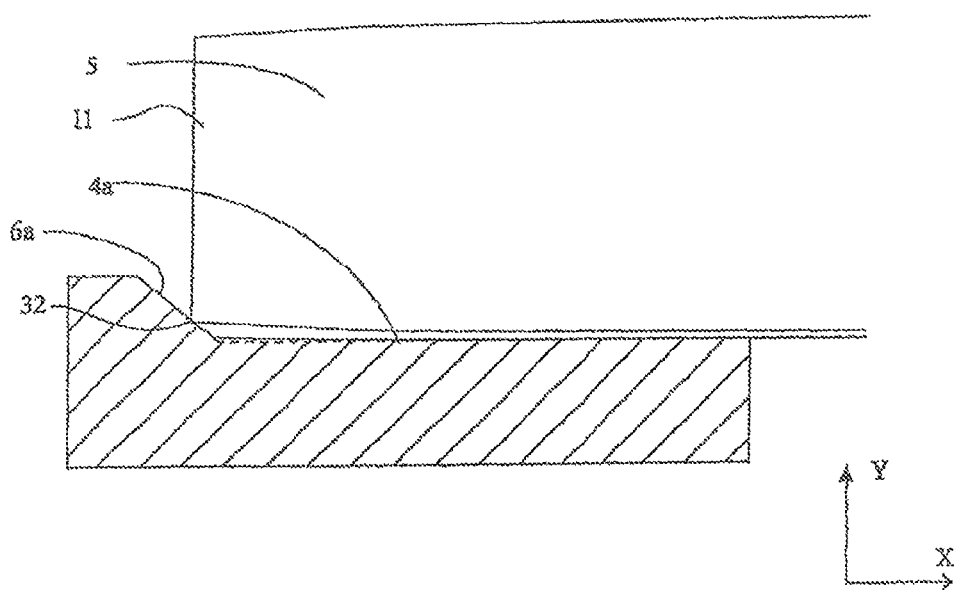
FIG. 9 shows a detailed illustration of a bearing ring with a roller body.

FIG. 9 shows an enlarged illustration of a bearing ring according to the prior art with a roller body 5. Here, the illustration has been enlarged to different degrees in the x and y directions.

It is apparent that when the roller body according to the prior art is used, an edge 32 of the roller body runs up against the rim face 6a of the rim. This running up of the edge also leads over time to an adverse effect on the rim face. The notch 7 is not shown in FIG. 9.

As mentioned at the beginning, the present invention is based on the object of increasing the service life of such roller bearings, and in particular of improving the running up of the roller bodies against the rims of the bearing ring or rings.

Figure 8:
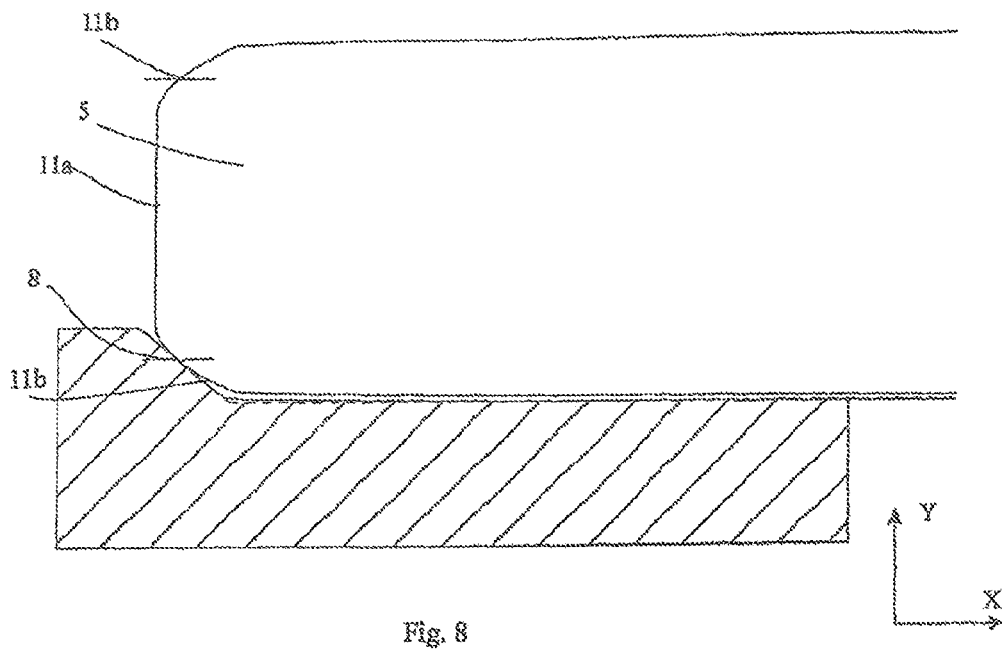
FIG. 8 shows an enlarged illustration of a roller bearing according to the invention.

FIG. 8 shows a bearing ring 2 which is used with a roller body 5 which is improved according to the invention. Here too, the illustration has been enlarged to different degrees in the x and y directions.

This roller body does not have any sharp corner edges but rather has rounded edge regions 11b which are embodied in this case in the manner of a torus. The grinding undercut or the notch is not shown in the illustration in FIG. 8. It is apparent that as a result of the toroidal embodiment of the edge region 11b, sharp-edged contact does not occur between the rim running face 6a and the end face 11 or the end face region 11b of the end face 11. As a result, during operation it is possible to avoid wear on the end face and therefore the roller body as well as the rim running face 6a. Ideally, in the embodiment shown in FIG. 8 essentially one contact face 8 is provided between the roller body and the rim running face 6a.

Figure 10:
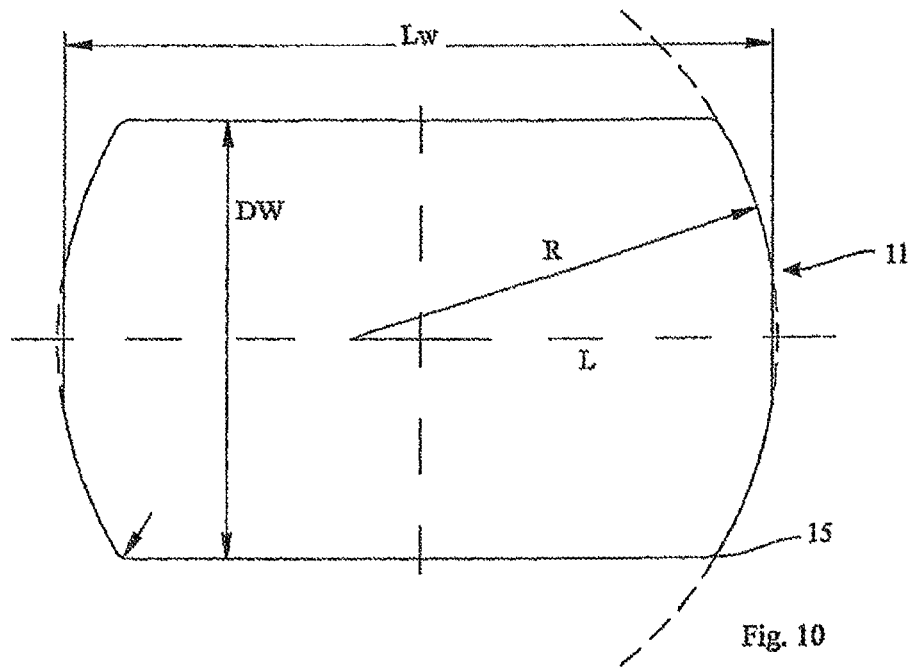
FIG. 10 shows a roller body.

FIG. 10 shows a roller body. It is apparent that the end face in this embodiment is of essentially spherical shape. The center point of this sphere or spherical segment face is located on the rotational axis L or axis L of symmetry of the roller body. The radius R of the spherical configuration is between 300 mm and 800 mm, preferably between 500 mm and 700 mm, and particularly preferably between 570 mm and 620 mm. However, the selection of this radius also depends on other geometries of the roller body, for example its length Lw and its diameter Dw. In the corner region 15, the roller body preferably has, as mentioned above, a radius between 1 mm and 2 mm. The use of a roller body 5 in the embodiment shown in FIG. 10 requires a rim angle of aperture in the vicinity of 92°. The reference sign DW characterizes the diameter of the roller body.

Figure 11:
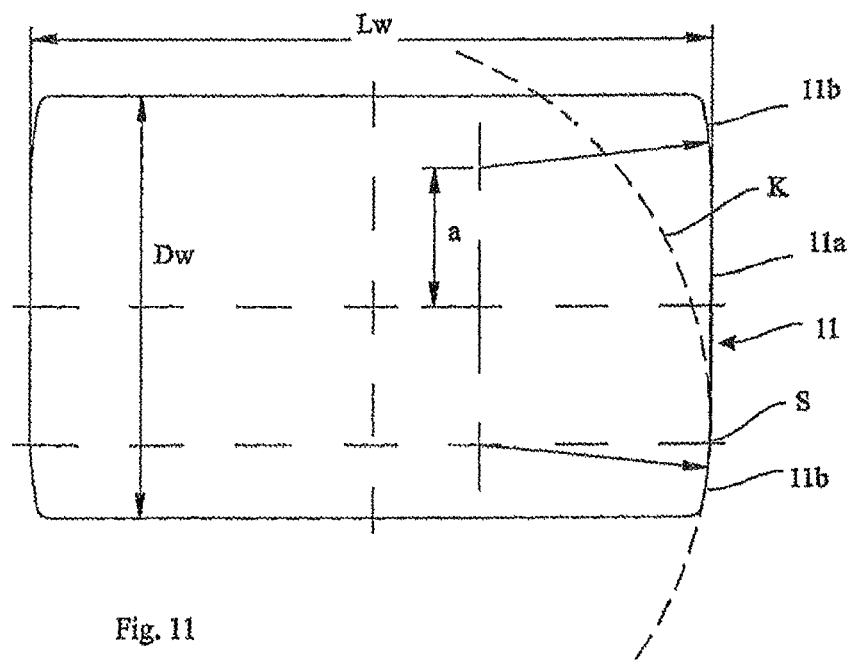
FIG. 11 shows a further embodiment of a roller body according to the invention.

FIG. 11 shows a further embodiment of the roller body according to the invention. In contrast to the embodiment shown in FIG. 10, the end face in the embodiment shown in FIG. 11 is of toroidal design. This means that here the center point of the circular faces 11b does not lie on the axis L of symmetry but rather is offset with respect to it by a predefined distance a. This is illustrated by the circular line K for the lower edge region 11b. In the embodiment shown in FIG. 11, the radius of the curvatures is in the regions 11b over the length L of the roller body.

In the point of intersection S between the toroidal center point line 14 and the end face 11, the central region 11a and the edge region 11b merge with one another without an edge.

The central region 11a of the end face can also have a planar profile in this embodiment. From FIG. 11 it is apparent that the geometric location of all the center points of the respective circular lines K is located itself on a circular ring around the axis of symmetry with the radius a.

The method according to the invention or the bearing components according to the invention result in a larger effective rim height and therefore an improved running up of the roller end face onto the rim face since the sharp edge of the notch 7 is dispensed with, and therefore this region can also be used for the running up of the roller body. Since the dressing, for example the grinding, takes place after the heat treatment, the cooling does not result in any distortion due to heat treatment of the individual bearing components.

Subsequent to this process, the lateral line and/or the roller end face or the roller end faces can preferably be honed.

Since production can occur in a clamped region between tips, it is also possible to avoid run-out errors with the respectively produced or processed roller bodies, which may arise due to remounting.

While specific embodiments of the invention have been shown and described in detail to illustrate the inventive principles, it will be understood that the invention may be embodied otherwise without departing from such principles.

We claim:

1. A bearing assembly, comprising:
   a plurality of roller bodies having an end face, the end face having a flat central region and a single curved region continuously curving in a single axial direction away from a plane of the central region at each end of the central region; and
   a bearing ring having a raceway for the roller bodies and a lateral rim extending radially from an end of the raceway, the lateral rim axially guiding the roller bodies and having a rim running face opposing the roller bodies, and a corner region with a notch being formed between the raceway and the rim running face such that the notch and the rim running face merge with one another essentially without an edge,
   wherein the end face of the rolling body is subjected to a hard-turning process, wherein the rim running face is subjected to a hard-turning process and is not ground and the raceway is ground,
   wherein only the curved regions of the roller bodies contact the rim running face at a single point and the central region of the roller bodies does not contact the rim running face.

2. The bearing assembly as claimed in claim 1, wherein the notch has a circular-segment-shaped profile at least in sections.

3. The bearing assembly as claimed in claim 2, wherein the circular-segment-shaped profile has a radius of curvature between 0.5 mm and 2.0 mm.

4. The bearing assembly as claimed in claim 1, wherein the notch has an end region which extends at an angle with respect to the raceway between 20° and 40°.

5. The bearing assembly as claimed in claim 2, wherein the circular-segment-shaped profile has a radius of curvature between 1.0 mm and 1.4 mm.

6. The bearing assembly as claimed in claim 1, wherein the notch has an end region which extends at an angle with respect to the raceway between 25° and 37°.

7. The bearing assembly as claimed in claim 1, wherein the notch has an end region which extends at an angle with respect to the raceway between 30° and 34°.

8. The bearing assembly as claimed in claim 1, wherein the end face is curved logarithmically or in a toroidal shape.

* * * * *